(12) United States Patent
Chai et al.

(10) Patent No.: US 9,913,183 B2
(45) Date of Patent: *Mar. 6, 2018

(54) METHOD FOR REPORTING A MEASUREMENT REPORT OF A MEASUREMENT EVENT

(71) Applicant: Huawei Technologies Co., Ltd., Shenzhen (CN)

(72) Inventors: Li Chai, Beijing (CN); Bo Lin, Beijing (CN); Jie Shi, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/158,309

(22) Filed: May 18, 2016

(65) Prior Publication Data

US 2016/0269950 A1   Sep. 15, 2016

Related U.S. Application Data

(63) Continuation of application No. 14/318,984, filed on Jun. 30, 2014, now Pat. No. 9,374,745, which is a
(Continued)

(30) Foreign Application Priority Data

Dec. 31, 2011   (CN) .......................... 2011 1 0459643

(51) Int. Cl.
*H04W 36/00*   (2009.01)
*H04W 24/10*   (2009.01)
(Continued)

(52) U.S. Cl.
CPC ....... *H04W 36/0088* (2013.01); *H04W 24/10* (2013.01); *H04W 74/006* (2013.01);
(Continued)

(58) Field of Classification Search
CPC ............. H04W 24/10; H04W 36/0088; H04W 76/048
See application file for complete search history.

(56) References Cited

U.S. PATENT DOCUMENTS

2011/0195706 A1   8/2011   Nakamori et al.
2014/0302865 A1   10/2014   Wei et al.

FOREIGN PATENT DOCUMENTS

CN   101656978 A   2/2010
CN   102256321 A   11/2011
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 9)," 3GPP TS 36.331, V9.9.0, pp. 1-253, 3rd Generation Partnership Project, Valbonne, France (Dec. 2011).
(Continued)

*Primary Examiner* — Pao Sinkantarakorn
(74) *Attorney, Agent, or Firm* — Leydig, Voit & Mayer, Ltd.

(57) ABSTRACT

The present invention discloses a method for reporting a measurement report of a measurement event, including: determining that a measurement event is generated in a user equipment UE in an activated state of discontinuous reception DRX mode; judging whether a first time to trigger corresponding to the measurement event is valid when it is determined that there is a measurement event generated; using, when it is judged that the first time to trigger is valid, the first time to trigger to time the measurement event; using, when it is judged that the first time to trigger is invalid, a second time to trigger to time the measurement event, such that the UE is in next one or next several activated states of DRX mode after the generation of the measurement event.
(Continued)

The present invention can improve a success rate of mobility handover between cells or wireless link quality.

10 Claims, 11 Drawing Sheets

Related U.S. Application Data continuation of application No. PCT/CN2012/087362, filed on Dec. 25, 2012.

(51) Int. Cl.
  *H04W 76/04* (2009.01)
  *H04W 74/00* (2009.01)
  *H04W 88/02* (2009.01)
  *H04W 88/08* (2009.01)

(52) U.S. Cl.
  CPC ....... *H04W 76/046* (2013.01); *H04W 76/048* (2013.01); *H04W 88/02* (2013.01); *H04W 88/08* (2013.01)

(56) References Cited

FOREIGN PATENT DOCUMENTS

| EP | 2157830 A1 | 2/2010 |
| EP | 2317799 A1 | 5/2011 |
| WO | WO 2010104446 A1 | 9/2010 |

OTHER PUBLICATIONS

"Time to Trigger and DRX Co-operation in E-UTRAN," 3GPP TSG-RAN WG2 Meeting #64, Prague, Czech Republic, R2-087185, 3rd Generation Partnership Project, Valbonne, France (Nov. 10-14, 2008).

"Further Consideration on Time to Trigger for Measurement Report in DRX," TSG-RAN WG4 Meeting #49bis, Ljubljana, Slovenia, R4-090132, 3rd Generation Partnership Project, Valbonne, France (Jan. 12-16, 2009).

"Time to Trigger Configuration and DRX," 3GPP TSG RAN WG2 #63bis, Prague, Czech Republic, R2-085537, 3rd Generation Partnership Project, Valbonne, France (Sep. 29-Oct. 3, 2008).

METHOD FOR REPORTING A MEASUREMENT REPORT OF A MEASUREMENT EVENT

CROSS-REFERENCE TO RELATED APPLICATIONS

This application is a continuation of U.S. patent application Ser. No. 14/318,984, filed on Jun. 30, 2014, which is a continuation of International Patent Application No. PCT/CN2012/087362, filed on Dec. 25, 2012, which claims priority to Chinese Patent Application No. 201110459643.9, filed on Dec. 31, 2011. The afore-mentioned patent applications are hereby incorporated by reference in their entireties.

TECHNICAL FIELD

The present invention relates to the communication technical field, and particularly, to a method for reporting a measurement report of a measurement event.

BACKGROUND

A base station in a wireless communication system, which may include a BS, eNodeB, node B, node, BTS (Base Transceiver Station) or AP (Access Point), etc., transmits data and/or control information to a user equipment UE via downlink, the user equipment UE may include an access terminal, access point, PDA (Personal Digital Assistant), laptop, etc., and the base station receives the data and/or control information of the user equipment via an uplink. Similarly, the user equipment transmits the data and/or control information for the base station via the uplink, and receives the data and/or control information transmitted from the base station via the downlink.

In the prior art, in order to satisfy or improve performance requirement of the wireless communication system (such as, an LTE-A and/or LTE-A (LTE-Advanced) communication system), various types of base stations or base stations of various standards are deployed in a homogeneous network so as to enhance coverage and performance of a network. Such a network structure is referred to as a heterogeneous network, wherein for example, the original base station, which is a lower transmission power base station (abbreviated as lower power node (LPN)) or an transmission/reception node, may include an Micro BS, Pico BS, Home BS, femto BS, Relay BS or RRH (Radio Remote Head), etc., whereas various types of base stations deployed in the heterogeneous network can be a high transmission power base station (such as Macro eNodeB, MeNB), the high transmission power base station and the lower power base station have different transmission powers.

As LTE of a 3G communication system, the LTE communication system can provide high-speed upstream and downstream data transmission. Due to a large amount of data transmission in the LTE communication system, data transmission has a relatively high requirement on power consumption of a receiving antenna: during the reception of data, the antenna shall monitor PDCCH (Physical Downlink Control Channel) only when data exists as far as possible, to receive downlink data or uplink authorization, and shall be in a sleep state as far as possible when there is no data. For example, when browse web pages, other web pages might be opened for a short while. To this end, it is necessary to be in a sleep state in a short time, and then monitor PDCCH after a certain timing relationship.

Therefore, in order to reduce energy consumption while ensuring performance, a discontinuous reception (DRX) technology is generated. A DRX function control entity in the LTE communication system is in an MAC layer of a protocol stack, with a main function of controlling the transmission of instructions to a physical layer, informing the physical layer to monitor PDCCH at a certain time, and disenabling the receiving antenna at all the other time, and making the system to be in sleep state. The DRX technology is a new power-saving working mechanism introduced in the LTE communication system, which cause the UE does not need to enter into an idle mode when there is no data transmission, while keeps in synchronization with the base station. For example, a DRX algorithm has been applied in TD-SCDMA. However, the algorithm is relatively simple, in particularly, the algorithm operates with a single DRX loop, receives downlink data and uplink authorization only during an activation period, and performs DRX loop according to a paging cycle in the idle mode. However, the DRX algorithm in a RRC (Radio Resource Control) protocol connection state adopts various types of timers which are cooperatively operated, so as to ensure the receiving of downlink data and uplink authorization.

Although the DRX function can greatly reduce the power consumption in the LTE communication system, a DRX cycle is much longer than a time to trigger of the UE. If there is a measurement event satisfying a generation condition before the UE enters into the sleep state, the time to trigger starts. After the UE enters into the sleep state, the time to trigger still runs normally; when returning back to an activated state, the UE reports a measurement report to the base station, but if the time to trigger expires at this time, signal quality states of a serving cell and a neighboring cell at this moment have changed, which will lead to handover failure or wireless link failure, thereby exerting a great influence on mobility performance.

SUMMARY

An aspect of the present invention provides a method for reporting a measurement report of a measurement event, which is capable of increasing a success rate of mobility handover between cells or improving wireless link quality.

An aspect of the present invention provides a method for reporting a measurement report of a measurement event, including: determining that a measurement event is generated in a user equipment UE in an activated state of a discontinuous reception (DRX) mode; judging whether a first time to trigger corresponding to the measurement event is valid; using, when it is judged that the first time to trigger is valid, the first time to trigger to time the measurement event; using, when it is judged that the first time to trigger is invalid, a second time to trigger to time the measurement event, such that the UE performs a measurement operation to a serving cell and at least one neighboring cell of the serving cell when being in a next one or next several activated states of the DRX mode after the generation of the measurement event, to obtain a measurement result; judging whether a previous one measurement event corresponding to the first time to trigger is still valid according to the measurement result; reporting, when the previous one measurement event is still valid, to a network the measurement report corresponding to the previous one measurement event; otherwise, not reporting the measurement report corresponding to the previous one measurement event to the network or updating the measurement event.

An aspect of the present invention provides another method for reporting a measurement report of a measurement event, including: determining that a measurement event is generated in a user equipment (UE) in an activated state of a DRX mode; using a first time to trigger corresponding to the measurement event to time the measurement event; if the first time to trigger has not expired when the UE enters a DRX sleep state, deciding whether the UE continues measuring in the sleep state until a first time to trigger expires and whether the measurement result is reported when the first time to trigger expires, according to measurement parameters configured for the measurement event by the network.

Another aspect of the present invention provides a method for configuring measurement parameters for a UE which generates a measurement event in an activated state of a DRX mode, including: issuing measurement parameters including a duration of the first time to trigger to the UE, such that the UE in the activated state of the DRX mode performs the measurement operation to the serving cell and at least one neighboring cell of the serving cell according to the issued measurement parameters including the duration of the first time to trigger; receiving a measurement report obtained by the UE using the measurement parameters, the measurement parameters configuring an appropriate duration of a second time to trigger for the measurement event or an reporting manner of the measurement report, such that a time from a time point at which the measurement event is generated to the time point at which the UE exits the DRX sleep state for a last time is less than or equal to a duration of the second time to trigger configured to the measurement event by the network, thereby making the UE, before the second time to trigger expires or at the expiring moment of the second time to trigger, in next one or next several activated states of the DRX mode after the generation of the measurement event.

A further aspect of the present invention provides a user equipment, including a determining unit for determining that there is a measurement event generated in a user equipment (UE) in an activated state of a discontinuous reception (DRX) mode; a first judging unit for judging whether a first time to trigger corresponding to the measurement event is valid when the determining unit determines that there is a measurement event generated; a configuring unit for using, when it is judged by the first judging unit that the first time to trigger is valid, the first time to trigger to time the measurement event and using, when it is judged by the first judging unit that the first time to trigger is invalid, a second time to trigger to time the measurement event, such that the UE is in a next one or next several activated states of the DRX mode after the generation of the measurement event; a measurement unit for re-performs a measurement operation to a serving cell and at least one neighboring cell of the serving cell according to measurement parameters configured by a network when the configuring unit uses the second time to trigger to time the measurement event, so as to obtain a measurement result; a second judging unit for judging whether a previous one measurement event corresponding to the first time to trigger is still valid according to the measurement result obtained by the measuring unit; a reporting processing unit for reporting, when the second judging unit judges that the previous one measurement event is still valid, to the network the measurement report of the previous one measurement event; otherwise, not reporting the measurement report of the previous one measurement event to the network or updating the measurement event; the measurement event being generated by performing a measurement operation to a serving cell and at least one neighboring cell of the serving cell according to the measurement parameters configured by the network and reporting the measurement report, the measurement operation generating the measurement report when the conditions are met.

A further aspect of the present invention provides a network equipment which generates a measurement event in an activated state of a DRX mode, including: an issuing unit for issuing measurement parameters to a UE, such that the UE in an activated state of the DRX mode performs the measurement operation to the serving cell and at least one neighboring cell of the serving cell according to the issued measurement parameters; a receiving unit for receiving a measurement report obtained by the UE using the measurement parameters, the measurement parameters configuring an appropriate duration of the time to trigger for the measurement event or an reporting manner of the measurement report such that a time from a time point at which the measurement event is generated to the time point at which the UE exits the DRX sleep state for the last time is less than or equal to the duration of the time to trigger configured to the measurement event by the network, thereby making the UE, before the time to trigger expires or at the expiring moment of the time to trigger, in next one or next several activated states of the DRX mode after the generation of the measurement event.

Different from the situation in the prior art where the use of an outdated measurement report leads to handover failure or wireless link failure, in an aspect of the present invention, it is judged whether the first time to trigger corresponding to the measurement event is valid when it is determined that there is an measurement event generated and it is necessary to report the measurement report; if it is judged that the first time to trigger corresponding to the measurement event is valid, the first time to trigger is used to time the measurement event and if it is judged that the first time to trigger corresponding to the measurement event is invalid, it indicates that it will result in the situation where the use of an outdated measurement report leads to handover failure or wireless link failure. Therefore, design is changed to make the UE, before the second time to trigger expires or at the expiring moment of the second time to trigger, in the next one or next several activated states of the DRX mode after the generation of the measurement event, such that when entering the activated state of the DRX mode again, the UE has an opportunity to perform measurement, to judge whether the previous one measurement report is still valid, and not to report to the network the measurement report of the previous one measurement event when the previous one measurement event is invalid, thereby enabling to avoid the situation where the use of an outdated measurement report leads to handover failure or wireless link failure, and increasing a success rate of mobility handover between cells or improving wireless link quality.

DESCRIPTION OF EMBODIMENTS

Generally, in order to ensure communication quality, the UE will perform a measurement operation to a serving cell and a neighboring cell according to a measurement parameter configured by the network in the activated state of the DRX mode, generate a measurement event under a certain condition, and report the measurement report when a certain condition is satisfied after the time to trigger (TTT) expires. When the DRX mode is configured for the UE, a 3GPP protocol restricts the measurement report reported to the network by the UE to some extent. For example, in order to avoid the UE frequently return to the activated state from the sleep state caused by the reporting of the measurement result, the UE delays the reporting of the measurement result (including two modes: event reporting and periodical reporting) as far as possible, and does not report the measurement result until a next activation time (from TS 36.331).

Meanwhile, the inventor of the present invention found in long-term research and development that in the prior art, if the UE is configured with the DRX mode and the cycle of the DRX mode is much longer than the time to trigger, then if there is a measurement event which satisfies generation condition before the UE enters the sleep state, a timer of the time to trigger is started and before long the UE enters into DRX sleep state, but the timer for the time to trigger normally runs; when the UE returns back to the activated state again and finds that the time to trigger has expired, then reports the measurement report obtained in the previous activated state to the base station. However, practically, the signal quality states of the serving cell and the neighboring cell in the activated state of this time may have changed, therefore the measurement report reported at this moment is no longer applicable, but the base station still continues the utilization of this measurement report unwittingly. In this way, it leads to the handover failure or wireless link failure. In view of system efficiency, the above technical problem will exert great influences on the mobility performance.

Especially in an emerging heterogeneous system scenario mentioned in the above Background portion, the number of times for the user equipment moving between cells will greatly increase. Therefore, in order to obtain relatively robust measurement function and seamless handover effect, the present invention provides the examples of corresponding method and equipment, allowing breaking the above limitation to the measurement report of the measurement event, such that the duration of the time to trigger and the measuring accuracy satisfy the demand before the measurement report is reported.

Figure 1:
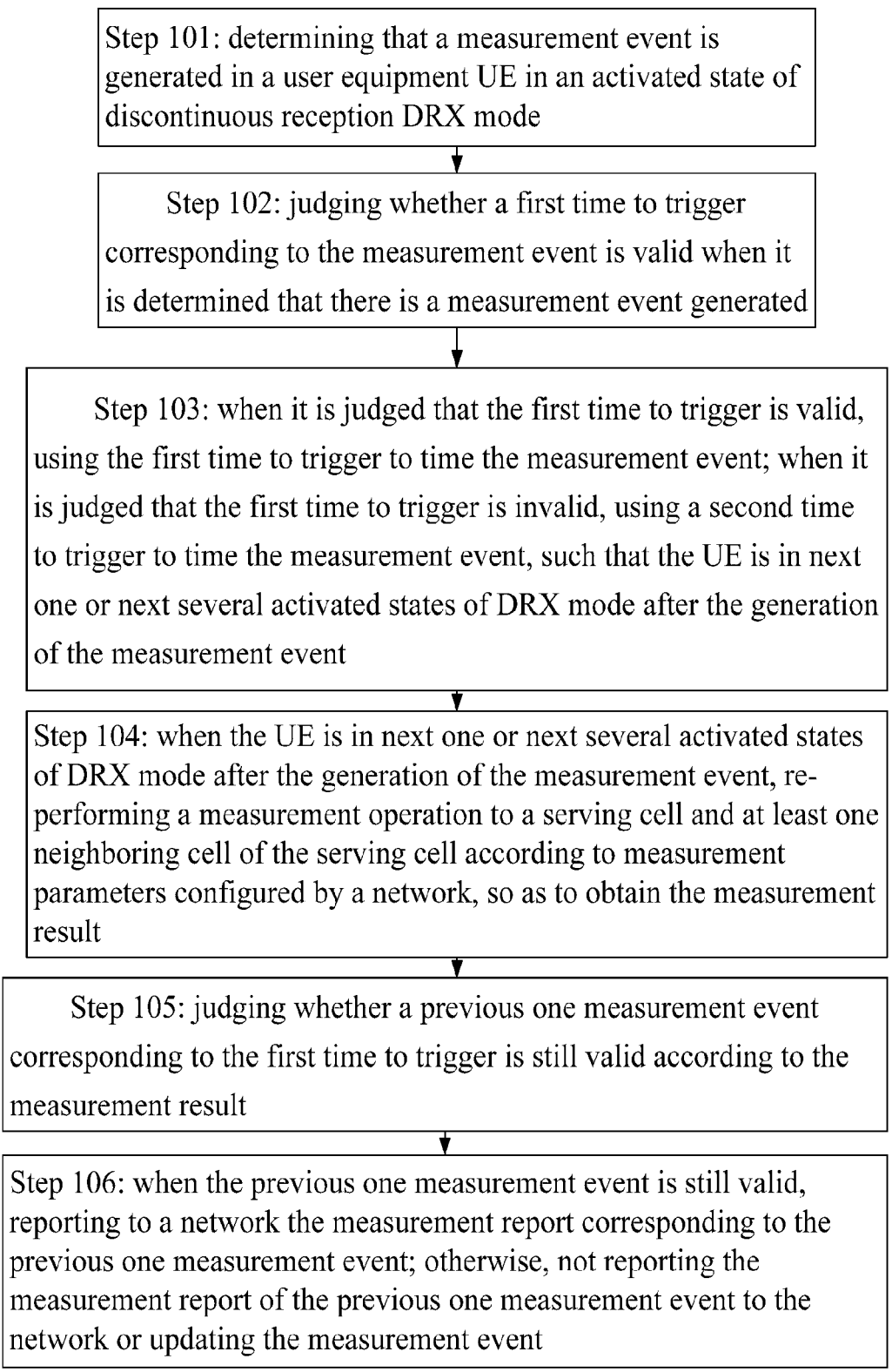
FIG. 1 is a flowchart of an example of the method for reporting a measurement report of a measurement event of the present invention.
Figure 2:
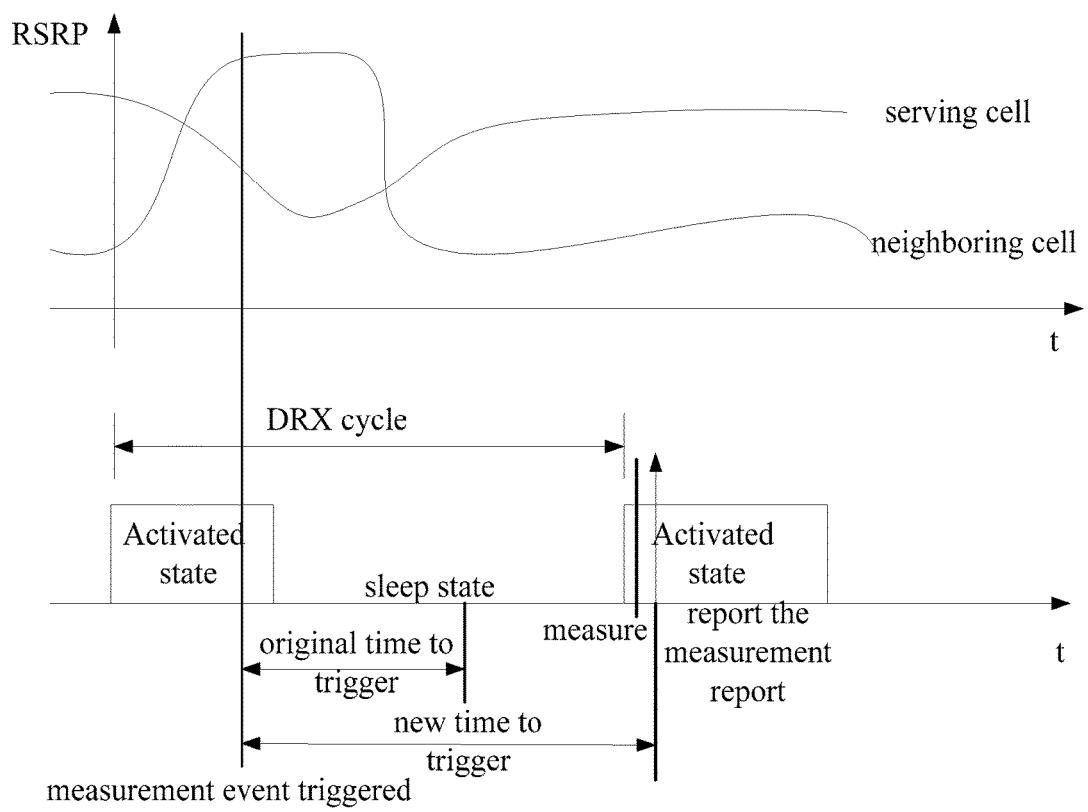
FIG. 2 is a schematic diagram shows the influence of the time to trigger on the reporting of the measurement report in the DRX mode in FIG. 1.

With reference to FIG. 1 and FIG. 2, one example of the method for reporting a measurement report of a measurement event includes:

Step 101: determining that there is a measurement event generated in a user equipment (UE) in an activated state of discontinuous reception (DRX) mode.

The network configures the DRX mode and the measurement parameters to the UE according to factors such as a traffic feature of the UE; when the UE is in the activated state of the DRX mode, it is determined that there is a measurement event generated. When a certain condition is satisfied, the measurement event is generated by performing a measurement operation to the serving cell and at least one neighboring cell according to the measurement parameters configured by the network and reporting the measurement report; whereas the measurement operation generates the measurement report when a certain condition is met.

Step 102: judging whether a first time to trigger corresponding to the measurement event is valid when it is determined that there is a measurement event generated.

In case of satisfying a certain condition, when it is determined that there is the measurement event generated and it is necessary to report the measurement report, it is judged whether the time from a time point at which the measurement event is generated to the time point at which the UE enters the DRX sleep state is less than the duration of the first time to trigger (original time to trigger), which is configured to the measurement event by the network, and whether the time (i.e., the time from a time point at which the measurement event is generated to the time point at which the UE enters the DRX activated state again) from a time point at which the measurement event is generated to the time point at which the UE exits the DRX sleep state for the last time is larger than the duration of the first time to trigger configured to the measurement event by the network, as shown in FIG. 2; if the time from a time point at which the measurement event is generated to the time point at which the UE enters the DRX sleep state is less than the duration of the first time to trigger configured to the measurement event by the network, and the time from a time point at which the measurement event is generated to the time point at which the UE exits the DRX sleep state for the last time is larger than the duration of the first time to trigger configured to the measurement event by the network, the first time to trigger is judged to be invalid, if the time from a time point at which the measurement event is generated to the time point at which the UE enters the DRX sleep state is greater than or equal to the duration of the first time to trigger configured to the measurement event by the network, and the time from a time point at which the measurement event is generated to the time point at which the UE exits the DRX sleep state for the last time is less than or equal to the duration of the first time to trigger configured to the measurement event by the network, the first time to trigger is judged to be valid.

Step 103: using, when it is judged that the first time to trigger is valid, the first time to trigger to time the measurement event; using, when it is judged that the first time to trigger is invalid, a second time to trigger to time the measurement event, such that the UE is in a next one or next several activated states of the DRX mode after the generation of the measurement event.

When it is judged that the first time to trigger is valid, the first time to trigger is used to time the measurement event, i.e., after the measurement event is generated, the first time to trigger is started, and when the first time to trigger expires and the measured cell signal strength/quality satisfies the measurement event condition all the time before the first time to trigger expires, the measurement event is reported to a network side. When it is judged that the first time to trigger is invalid, it indicates that the outdated measurement report will be used in the next activated state, thereby possibly leading to handover failure or wireless link failure. Therefore, in order to avoid such situation, design is changed to make the UE before the second time to trigger expires or when the second time to trigger expires in next one or next several activated states of DRX mode after the generation of the measurement event, such that when entering the activated state of the DRX mode again, the UE has an opportunity to perform measurement so as to select whether to use the measurement report of the last time.

The step of making the UE before the second time to trigger expires or at the overtime moment of the second time to trigger in the next one or next several activated states of the DRX mode after the generation of the measurement event can not only be realized by the control performed by UE itself, but also could be realized by the network controlling UE, and can not only be realized by adjusting the duration of the first time to trigger or rearrange the second time to trigger without changing the distribution of the activated state or sleep state of the existing DRX mode, but also could be realized by making the UE have a report indication of reporting the measurement event before the first time to trigger expires or at the overtime moment of the first time to trigger without changing the duration of the first time to trigger, for example, making the UE in the activated state at this time, etc. The example of the present invention is not limited thereto.

Step 104: re-performing a measurement operation on a serving cell and at least one neighboring cell of the serving cell according to measurement parameters configured by a network, when the UE is in next one or next several activated states of DRX mode after the generation of the measurement event, so as to obtain the measurement result.

As stated above, by various methods, the UE is caused to have an opportunity to perform measurement when entering the activated state of the DRX mode again, so as to judge whether the previous measurement report is still valid.

Step 105: judging whether a previous one measurement event corresponding to the first time to trigger is still valid according to the measurement result.

For example, in the previous one activated state, the result of the previous one measurement operation corresponding to the first time to trigger is that the signal of the neighboring cell is better than that of the current serving cell. However, in this activated state, the result of the measurement operation is that the signal of the neighboring cell is worse than that of the current serving cell, then the measurement report corresponding to the previous one measurement event in the activated state is outdated and is judged to be invalid.

Step 106: reporting, when the previous one measurement event is still valid, to a network the measurement report corresponding to the previous one measurement event; otherwise, not reporting the measurement report of the previous one measurement event to the network or updating the measurement event.

As stated before, if the measurement report corresponding to the previous one measurement event in the activated state is outdated, it is judged to be invalid, then at this time, the measurement report of the previous one measurement event is not reported to the network and the measurement event is not updated; certainly, when the judgment result is that the measurement report corresponding to the previous one measurement event in the activated state is not outdated and is valid, then the measurement report of the previous one measurement event is reported to the network.

It can be understood that in the example of the present invention, it is judged whether the first time to trigger corresponding to the measurement event is valid when it is determined that there is an measurement event generated and it is necessary to report the measurement report; if it is judged that the first time to trigger is invalid, it indicates that it will result in the use of an outdated measurement report and might lead to handover failure or wireless link failure. Therefore, design is changed to make the UE before the second time to trigger expires or at the overtime moment of the second time to trigger in the next one or next several activated states of the DRX mode after the generation of the measurement event, such that when entering the activated state of the DRX mode again, the UE has an opportunity to perform measurement, to judge whether the previous one measurement report is still valid, and not to report to the network the measurement report of the previous one measurement event or update the measurement event when the previous one measurement event is invalid, thereby enabling to avoid the use of an outdated measurement report which might lead to handover failure or wireless link failure, and increasing a success rate of mobility handover between cells or improving wireless link quality.

Figure 3:
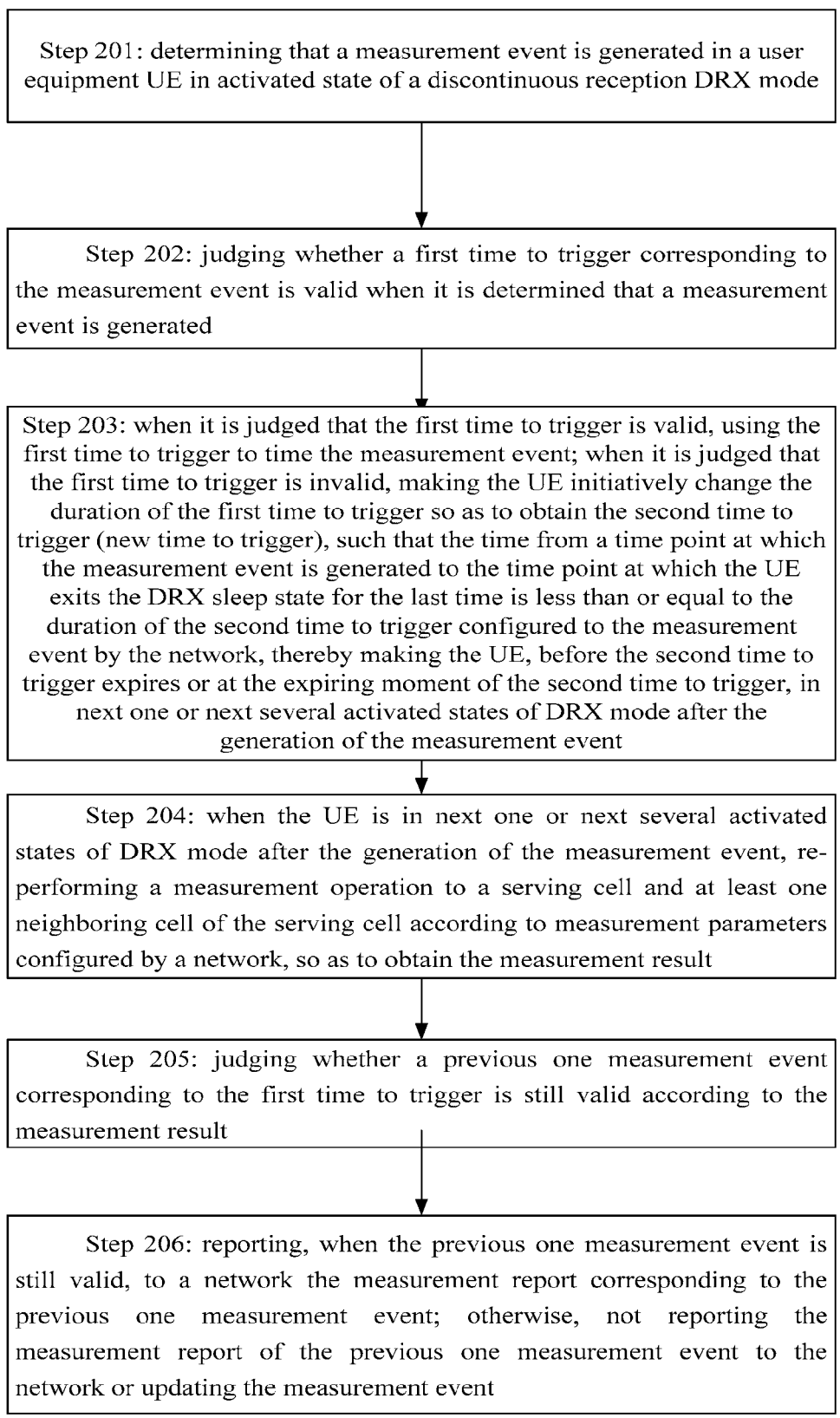
FIG. 3 is a flowchart of another example of the method for reporting a measurement report of a measurement event of the present invention.

With reference to FIGS. 2 and 3, another example of the method for reporting a measurement report of a measurement event of the invention includes:

Step 201: determining that there is a measurement event generated in a user equipment (UE) in an activated state of discontinuous reception DRX mode.

When a certain condition is satisfied, the measurement event is generated by performing a measurement operation on the serving cell and at least one neighboring cell according to the measurement parameters configured by the network and reporting the measurement report; the measurement operation generates the measurement report when a certain condition is met.

Step 202: judging whether a first time to trigger corresponding to the measurement event is valid when it is determined that a measurement event is generated.

In case of satisfying a certain condition, when it is determined that the measurement event is generated and it is necessary to report the measurement report, it is judged whether the time from a time point at which the measurement event is generated to the time point at which the UE enters the DRX sleep state is less than the duration of the first time to trigger (original time to trigger) configured to the measurement event by the network, and whether the time (i.e., the time from a time point at which the measurement event is generated to the time point at which the UE enters the DRX activated state again) from a time point at which the measurement event is generated to the time point at which the UE exits the DRX sleep state for the last time is larger than the duration of the first time to trigger configured to the measurement event by the network, as shown in FIG. 2; if the time from a time point at which the measurement event is generated to the time point at which the UE enters the DRX sleep state is less than the duration of the first time to trigger configured to the measurement event by the network, and the time from a time point at which the measurement event is generated to the time point at which the UE exits the DRX sleep state for the last time is larger than the duration of the first time to trigger configured to the measurement event by the network, the first time to trigger is judged to be invalid, if the time from a time point at which the measurement event is generated to the time point at which the UE enters the DRX sleep state is greater than or equal to the duration of the first time to trigger configured to the measurement event by the network, and the time from a time point at which the measurement event is generated to the time point at which the UE exits the DRX sleep state for the last time is less than or equal to the duration of the first time to trigger configured to the measurement event by the network, the first time to trigger is judged to be valid.

Step 203: using, when it is judged that the first time to trigger is valid, the first time to trigger to time the measurement event; making, when it is judged that the first time to trigger is invalid, the UE initiatively change the duration of the first time to trigger so as to obtain the second time to trigger (new time to trigger), such that the time from a time point at which the measurement event is generated to the time point at which the UE exits the DRX sleep state for the last time is less than or equal to the duration of the second time to trigger configured to the measurement event by the network, thereby making the UE before the second time to trigger expires or at the overtime moment of the second time to trigger in next one or next several activated states of DRX mode after the generation of the measurement event.

When it is judged that the first time to trigger is valid, the first time to trigger is used to time the measurement event, i.e., after the measurement event is generated, the first time to trigger is started, and when the first time to trigger expires and the measured cell signal strength/quality satisfies the measurement event condition all the time before the first time to trigger expires, the measurement event is reported to a network side. When it is judged that the first time to trigger is invalid, it indicates that the outdated measurement report will be used in the next activated state, thereby possibly leading to handover failure or wireless link failure. Therefore, in order to avoid such situation, design is changed: the UE automatically changes the duration of the first time to trigger according to the duration of entering the DRX sleep state this time and the measurement accuracy demands, such that when entering an activated state of the DRX mode again, the UE has an opportunity to perform measurement so as to select whether to use the previous one measurement report.

Step 204: re-performing a measurement operation on a serving cell and at least one neighboring cell of the serving cell according to measurement parameters configured by a network when the UE is in next one or next several activated states of DRX mode after the generation of the measurement event, so as to obtain the measurement result.

As stated above, by various methods, when entering the activated state of the DRX mode again, the UE is caused to have an opportunity to perform measurement so as to judge whether the previous one measurement report is still valid.

Step 205: judging whether a previous one measurement event corresponding to the first time to trigger is still valid according to the measurement result.

For example, in the previous one activated state, the result of the previous one measurement operation is that the signal of the neighboring cell is better than that of the current serving cell. However, in this activated state, the result of the measurement operation is that the signal of the neighboring cell is worse than that of the current serving cell, then the measurement report corresponding to the previous one measurement event in the activated state is outdated and is judged to be invalid.

Step 206: reporting, when the previous one measurement event is still valid, to a network the measurement report corresponding to the previous one measurement event; otherwise, not reporting the measurement report of the previous one measurement event to the network or updating the measurement event.

As stated before, the measurement report corresponding to the previous one measurement event in the activated state is outdated and is judged to be invalid, and at this time, the measurement report of the previous one measurement event is not reported to the network and the measurement event is not updated; certainly, when the judgment result is that the measurement report corresponding to the previous one measurement event in the activated state is not outdated and is valid, the measurement report of the previous one measurement event is reported to the network.

In the present example, the UE initiatively adjusts the duration of the time to trigger. In the next example, it is possible to control the duration of the time to trigger by the network.

Figure 4:
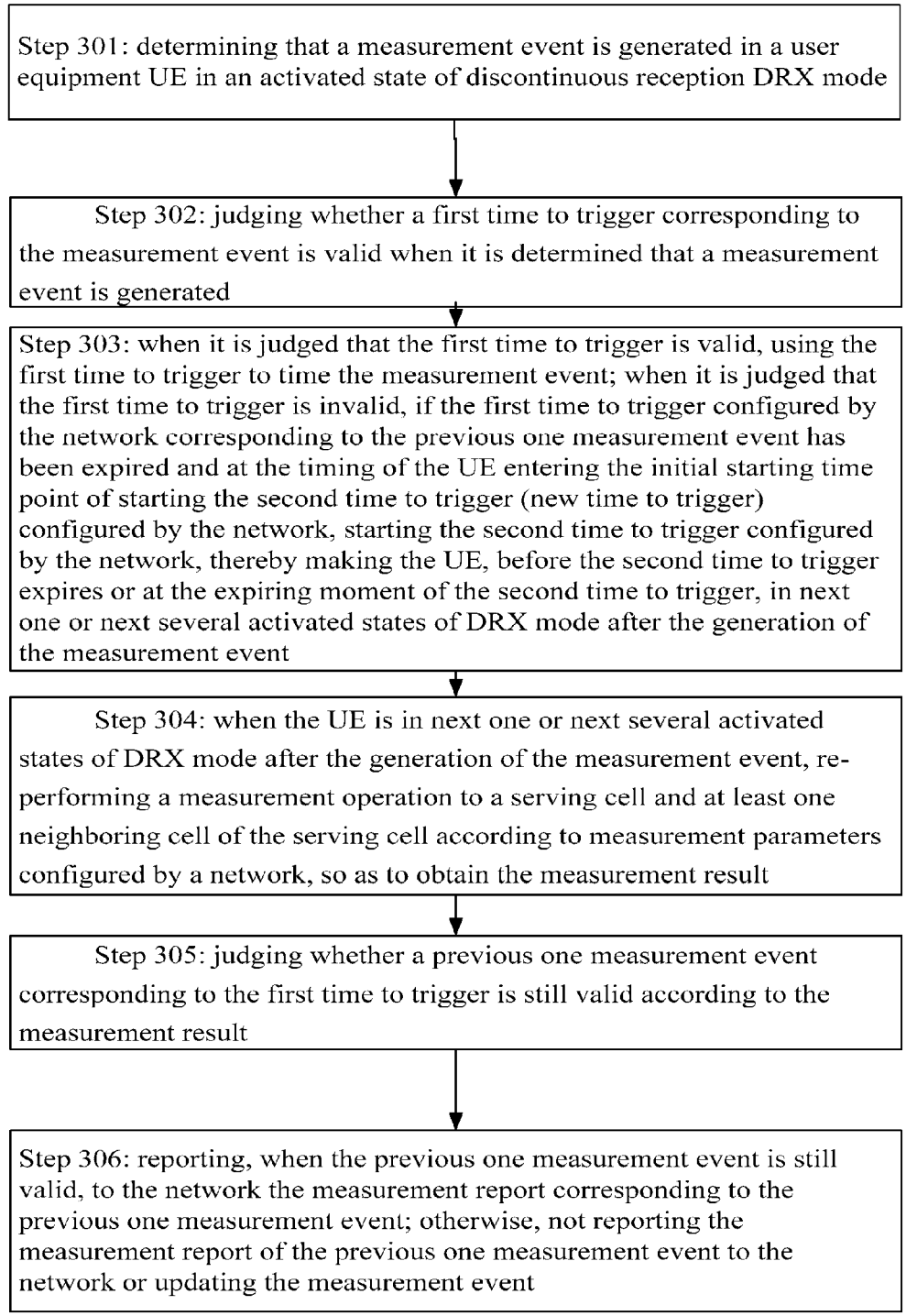
FIG. 4 is a flowchart of a further example of the method for reporting a measurement event report of a measurement event of the present invention.
Figure 5:
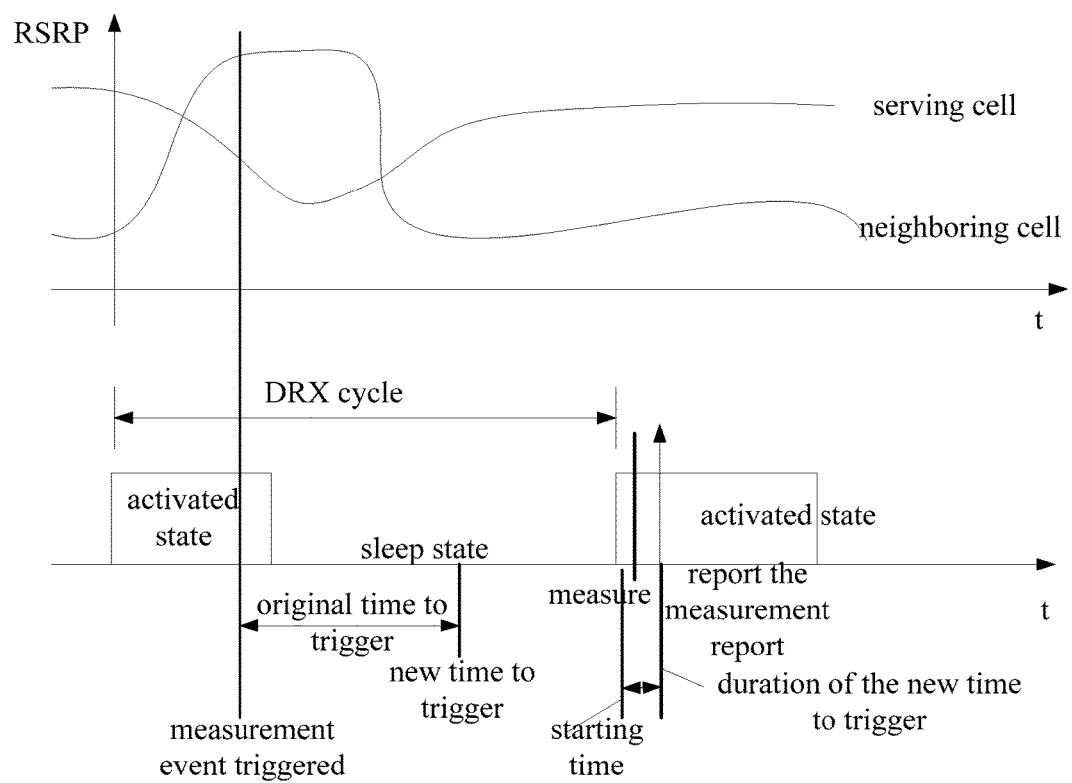
FIG. 5 is a schematic diagram shows the influence of the time to trigger on the reporting of the measurement report in the DRX mode in FIG. 4.

With reference to FIGS. 4 and 5, a further example of the method for reporting a measurement report of a measurement event of the invention includes:

Step 301: determining that there is a measurement event generated in a user equipment UE in activated state of a discontinuous reception DRX mode.

The network configures the DRX mode and measurement parameters to the UE according to factors such as a traffic feature of the UE; wherein the measurement parameters include the first time to trigger, and include the second time to trigger pre-configured to the DRX mode by the base station. The second time to trigger includes an initial starting time point at which the UE restarts the second time to trigger and the duration of the time to trigger; for example, the initial starting time point of the second time to trigger can be the timing at which the UE re-enters the DRX activated state or 2 ms after the UE re-enters the DRX activated state. The measurement event is generated by performing a measurement operation to the serving cell and at least one neighboring cell according to the measurement parameters configured by the network and reporting the measurement report; the measurement operation generates the measurement report when a certain condition is met.

Step 302: judging whether a first time to trigger corresponding to the measurement event is valid when it is determined that a measurement event is generated.

In case of satisfying a certain condition, when it is determined that a measurement event is generated and it is necessary to report the measurement report, it is judged whether the time from a time point at which the measurement event is generated to the time point at which the UE enters the DRX sleep state is less than the duration of the first time to trigger (original time to trigger) configured to the measurement event by the network, and whether the time (i.e., the time from a time point at which the measurement event is generated to the time point at which the UE enters the DRX activated state again) from a time point at which the measurement event is generated to the time point at which the UE exits the DRX sleep state for the last time is larger than the duration of the first time to trigger configured to the measurement event by the network, as shown in FIG. 5; if the time from a time point at which the measurement event is generated to the time point at which the UE enters the DRX sleep state is less than the duration of the first time to trigger configured to the measurement event by the network, and the time from a time point at which the measurement event is generated to the time point at which the UE exits the DRX sleep state for the last time is larger than the duration of the first time to trigger configured to the measurement event by the network, the first time to trigger is judged to be invalid, if the time from a time point at which the measurement event is generated to the time point at which the UE enters the DRX sleep state is greater than or equal to the duration of the first time to trigger configured to the measurement event by the network, and the time from a time point at which the measurement event is generated to the time point at which the UE exits the DRX sleep state for the last time is less than or equal to the duration of the first time to trigger configured to the measurement event by the network, the first time to trigger is judged to be valid.

When it is determined that there is a measurement event generated, the UE applies the first time to trigger; when the first time to trigger does not expire, the UE enters the sleep state of the DRX mode.

Step 303: using, when it is judged that the first time to trigger is valid, the first time to trigger to time the measurement event; enabling, when it is judged that the first time to trigger is invalid, the second time to trigger configured by the network at a timing when the first time to trigger configured by the network corresponding to the previous one measurement event has been expired and the UE entering the initial starting time point for starting the second time to trigger (new time to trigger) configured by the network, thereby making the UE, before the second time to trigger expires or at the expiring moment of the second time to trigger, in the next one or next several activated states of the DRX mode after the generation of the measurement event.

When it is judged that the first time to trigger is valid, the first time to trigger is used to time the measurement event, i.e., after the measurement event is generated, the first time to trigger is started, and when the first time to trigger expires and if the measured cell signal strength and/or quality satisfies the measurement event condition all the time before the first time to trigger expires, the measurement event is reported to a network side. When it is judged that the first time to trigger is invalid, it indicates that the outdated measurement report will be used in the next activated state, thereby possibly leading to handover failure or wireless link failure. Therefore, in order to avoid such situation, design is changed: the network pre-configures the second time to trigger. When the UE re-enters the activated state of the DRX mode and if the condition of step 302 is satisfied, the measurement event is generated again, the UE uses the second time to trigger, such that when entering the activated state of the DRX mode again, the UE has an opportunity to perform measurement so as to select whether to use the previous one measurement report.

Step 304: when the UE is in the next one or next several activated states of the DRX mode after the generation of the measurement event, re-performing a measurement operation to a serving cell and at least one neighboring cell of the serving cell according to measurement parameters configured by a network, so as to obtain a measurement result.

As stated above, various methods are adopted to let the UE has an opportunity to perform measurement at the time of entering the activated state of the DRX mode again, so as to judge whether the previous one measurement report is still valid.

Step 305: judging whether a previous one measurement event corresponding to the first time to trigger is still valid according to the measurement result.

For example, in the previous one activated state, the result of the previous one measurement operation is that the signal of the neighboring cell is better than that of the current serving cell. However, in the present activated state, the result of the measurement operation is that the signal of the neighboring cell is worse than that of the current serving cell, then the measurement report corresponding to the previous one measurement event in the activated state is outdated and is judged to be invalid.

Step 306: reporting, when the previous one measurement event is still valid, to a network the measurement report corresponding to the previous one measurement event; otherwise, not reporting the measurement report of the previous one measurement event to the network or updating the measurement event.

As stated before, if the measurement report corresponding to the previous one measurement event in the activated state is outdated, it is judged to be invalid, and at this time, the measurement report of the previous one measurement event is not reported to the network or the measurement event is updated; certainly, if the judgment result is that the measurement report corresponding to the previous one measurement event in the activated state is not outdated and is valid, the measurement report of the previous one measurement event is reported to the network.

Figure 6:
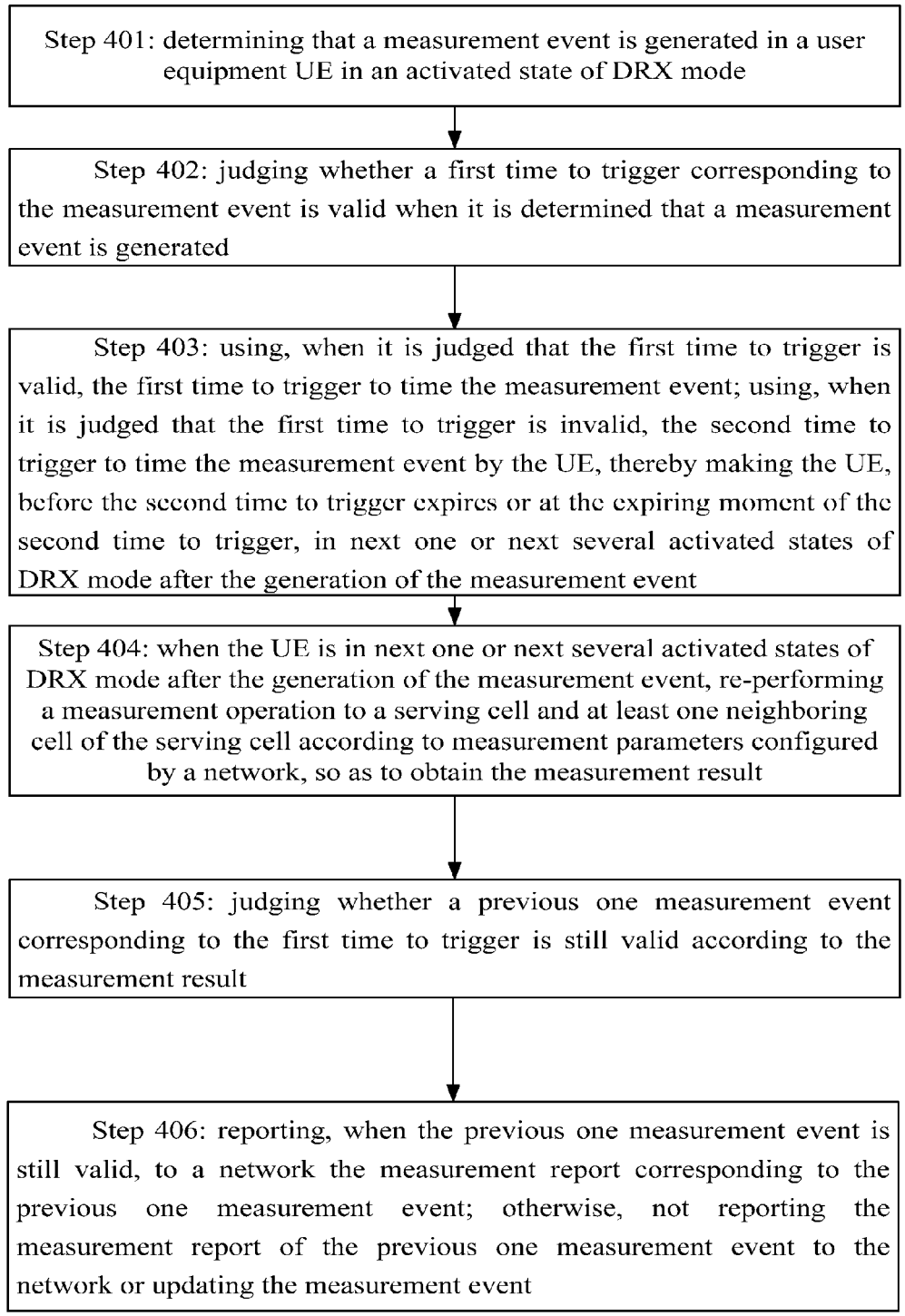
FIG. 6 is a flowchart of a further example of the method for reporting a measurement report of a measurement event of the present invention.

With reference to FIGS. 5 and 6, a further example of the method for reporting a measurement report of a measurement event of the invention includes:

Step 401: determining that there is a measurement event generated in a user equipment UE in an activated state of DRX mode.

The network configures the DRX mode and measurement parameters to the UE according to factors such as a traffic feature of the UE; wherein the measurement parameters include the first time to trigger and the second time to trigger pre-configured for the DRX mode by the base station. The second time to trigger only includes an initial starting time point at which the UE restarts the second time to trigger. The measurement event is generated by performing a measurement operation to the serving cell and at least one neighboring cell according to the measurement parameters configured by the network and reporting the measurement report; the measurement operation generates the measurement report when a certain condition is met.

Step 402: when it is determined that there is a measurement event generated, judging whether a first time to trigger corresponding to the measurement event is valid.

In case of satisfying a certain condition, when it is determined that there is the measurement event generated and it is necessary to report the measurement report, it is judged whether the time from a time point at which the measurement event is generated to the time point at which the UE enters the DRX sleep state for the present time is less than the duration of the first time to trigger (original time to trigger) configured to the measurement event by the network, and whether the time (i.e., the time from a time point at which the measurement event is generated to the time point at which the UE enters the DRX activated state again) from a time point at which the measurement event is generated to the time point at which the UE exits the DRX sleep state for the last time is larger than the duration of the first time to trigger configured to the measurement event by the network, as shown in FIG. 5; if the time from a time point at which the measurement event is generated to the time point at which the UE enters the DRX sleep state for the present time is less than the duration of the first time to trigger configured to the measurement event by the network, and the time from a time point at which the measurement event is generated to the time point at which the UE exits the DRX sleep state for the last time is larger than the duration of the first time to trigger configured to the measurement event by the network, the first time to trigger is judged to be invalid; if the time from a time point at which the measurement event is generated to the time point at which the UE enters the DRX sleep state for the present time is greater than or equal to the duration of the first time to trigger configured to the measurement event by the network, and the time from a time point at which the measurement event is generated to the time point at which the UE exits the DRX sleep state for the last time is less than or equal to the duration of the first time to trigger configured to the measurement event by the network, the first time to trigger is judged to be valid.

When it is determined that there is the measurement event generated, the UE applies the first time to trigger; when the first time to trigger does not expire, the UE enters the sleep state of the DRX mode.

Step 403: using, when it is judged that the first time to trigger is valid, the first time to trigger to time the measurement event; using, when it is judged that the first time to trigger is invalid, the second time to trigger to time the measurement event by the UE, thereby making the UE before the second time to trigger expires or at the expiring moment of the second time to trigger in next one or next several activated states of DRX mode after the generation of the measurement event.

When it is judged that the first time to trigger is valid, the first time to trigger is used to time the measurement event, i.e., after the measurement event is generated, the first time to trigger is started, and if the measured cell signal strength and/or quality satisfies the measurement event condition all the time before the first time to trigger expires, then the measurement event is reported to a network side at the expiring moment of the first time to trigger. When it is judged that the first time to trigger is invalid, it indicates that the outdated measurement report will be used in the next activated state, thereby possibly leading to handover failure or wireless link failure. Therefore, in order to avoid such situation, design is changed: the network pre-configures the second time to trigger. The UE uses the second time to trigger to time the measurement event, such that when entering the activated state of the DRX mode again, the UE has an opportunity to perform measurement so as to select whether to use the previous one measurement report.

Step 404: when the UE is in the next one or next several activated states of the DRX mode after the generation of the measurement event, re-performing a measurement operation to a serving cell and at least one neighboring cell of the serving cell according to measurement parameters configured by a network, so as to obtain the measurement result.

As stated above, various methods are adopted to let the UE has an opportunity to perform measurement when entering the activated state of the DRX mode again, so as to judge whether the previous one measurement report is still valid.

Step 405: judging whether a previous one measurement event corresponding to the first time to trigger is still valid according to the measurement result.

For example, in the previous one activated state, the result of the previous one measurement operation is that the signal of the neighboring cell is better than that of the current serving cell. However, in this activated state, the result of the measurement operation is that the signal of the neighboring cell is worse than that of the current serving cell, and the measurement report corresponding to the previous one measurement event in the activated state is outdated and is judged to be invalid.

Step 406: reporting, when the previous one measurement event is still valid, to a network the measurement report corresponding to the previous one measurement event; otherwise, not reporting the measurement report of the previous one measurement event to the network or updating the measurement event.

Figure 7:
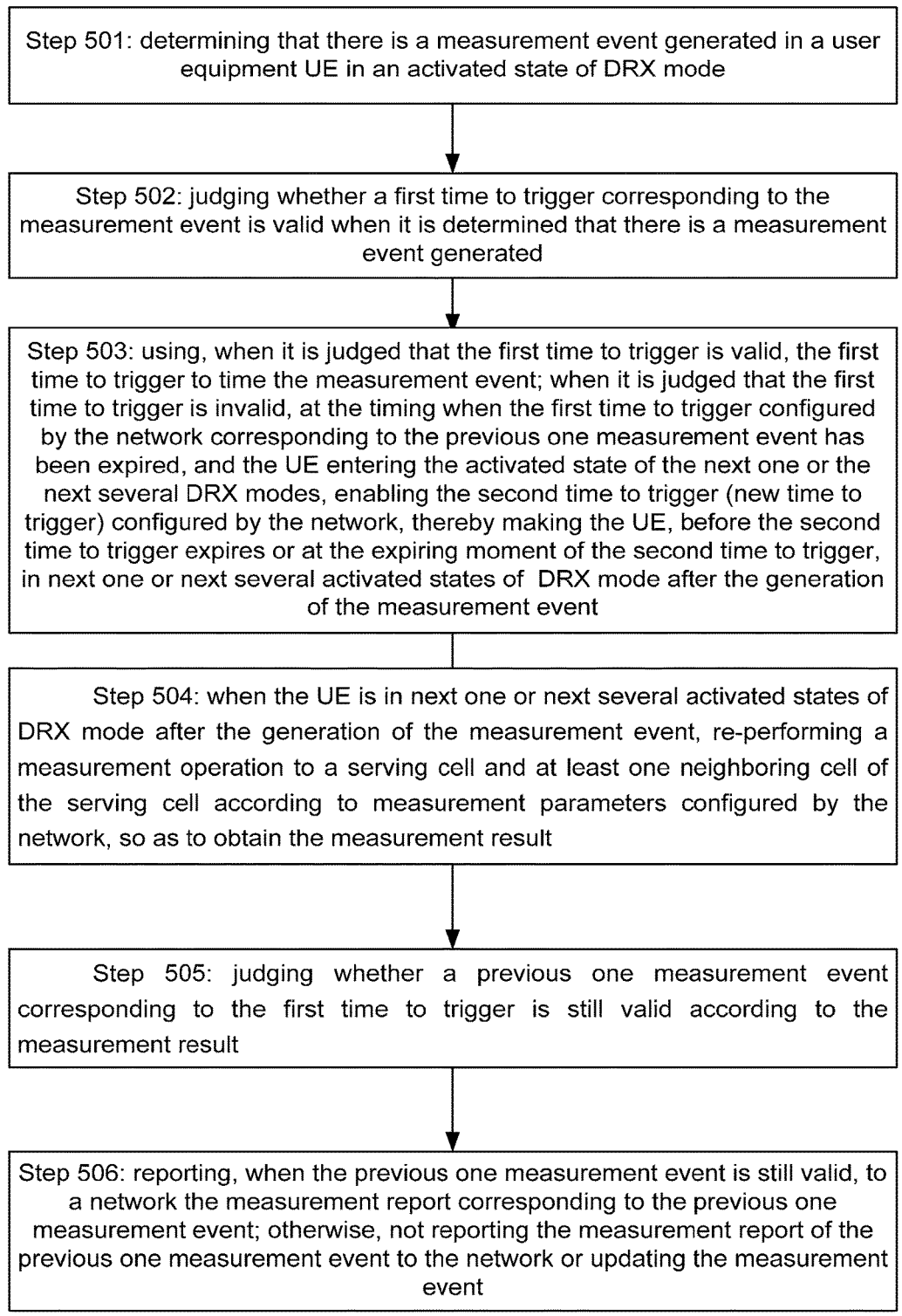
FIG. 7 is a flowchart of a further example of the method for reporting a measurement report of a measurement event of the present invention.

With reference to FIGS. 5 and 7, a further example of the method for reporting a measurement report of a measurement event of the invention includes:

Step 501: determining that there is a measurement event generated in a user equipment UE in activated state of a DRX mode.

The network configures the DRX mode for the UE according to factors such as a traffic feature of the UE, and configures the measurement parameters for the UE; wherein the measurement parameters include the first time to trigger, and include the second time to trigger pre-configured for the DRX mode by the base station. The second time to trigger includes the duration of the second time to trigger. The measurement event is generated by performing a measurement operation to the serving cell and at least one neighboring cell according to the measurement parameters configured by the network and reporting the measurement report; the measurement operation generates the measurement report when a certain condition is met.

Step 502: judging whether a first time to trigger corresponding to the measurement event is valid when it is determined that there is a measurement event generated.

In case of satisfying a certain condition, when it is determined that the measurement event is generated and it is necessary to report the measurement report, it is judged whether the time from a time point at which the measurement event is generated to the time point at which the UE enters the DRX sleep state is less than the duration of the first time to trigger (original time to trigger) configured to the measurement event by the network, and whether the time from a time point at which the measurement event is generated to the time point at which the UE exits the DRX sleep state for the last time is larger than the duration of the first time to trigger configured to the measurement event by the network, as shown in FIG. 5; if the time from a time point at which the measurement event is generated to the time point at which the UE enters the DRX sleep state is less than the duration of the first time to trigger configured to the measurement event by the network, and the time from a time point at which the measurement event is generated to the time point at which the UE exits the DRX sleep state for the last time is larger than the duration of the first time to trigger configured to the measurement event by the network, the first time to trigger is judged to be invalid, if the time from a time point at which the measurement event is generated to the time point at which the UE enters the DRX sleep state is greater than or equal to the duration of the first time to trigger configured to the measurement event by the network, and the time from a time point at which the measurement event is generated to the time point at which the UE exits the DRX sleep state for the last time is less than or equal to the duration of the first time to trigger configured to the measurement event by the network, the first time to trigger is judged to be valid.

When it is determined that the measurement event is generated, the UE applies the first time to trigger; when the first time to trigger has not expired, the UE enters the sleep state of the DRX mode.

Step 503: using, when it is judged that the first time to trigger is valid, the first time to trigger to time the measurement event; when it is judged that the first time to trigger is invalid, and if the first time to trigger (corresponding to the measurement event of the last time and being configured by the network) has expired and at a timing of the UE entering next one or the next several activated states of DRX mode, enabling the second time to trigger (new time to trigger) configured by the network, thereby making the UE, before the second time to trigger expires or at the expiring moment of the second time to trigger, be in the next one or next several activated states of the DRX mode after the generation of the measurement event.

When it is judged that the first time to trigger is valid, the first time to trigger is used to time the measurement event, i.e., after the measurement event is generated, the first time to trigger is started, and when the first time to trigger expires and the measured cell signal strength/quality satisfies the measurement event condition all the time before the first time to trigger expires, the measurement event is reported to a network side. When it is judged that the first time to trigger is invalid, it indicates that the outdated measurement report will be used in the next activated state, thereby possibly leading to handover failure or wireless link failure. Therefore, in order to avoid such situation, design is changed: the network pre-configures the second time to trigger. When the UE re-enters the activated state of the DRX mode, UE starts the second time to trigger, such that when entering the activated state of the DRX mode again, the UE has an opportunity to perform measurement so as to select whether to use the previous one measurement report.

Step 504: when the UE is in next one or next several activated states of DRX mode after the generation of the measurement event, re-performing a measurement operation to a serving cell and at least one neighboring cell of the serving cell according to the measurement parameters configured by a network, so as to obtain measurement result.

As stated above, various methods are adopted to let the UE has an opportunity to perform measurement at the timing of entering the activated state of the DRX mode again, so as to judge whether the previous one measurement report is still valid.

Step 505: judging whether a previous one measurement event corresponding to the first time to trigger is still valid according to the measurement result.

For example, in the previous one activated state, the result of the previous one measurement operation is that the signal of the neighboring cell is better than that of the current serving cell. However, in this activated state, the result of the measurement operation is that the signal of the neighboring cell is worse than that of the current serving cell, then the measurement report corresponding to the previous one measurement event in the activated state is outdated and is judged to be invalid.

Step 506: when the previous one measurement event is still valid, reporting the measurement report corresponding to the previous one measurement event to the network; otherwise, not reporting the measurement report of the previous one measurement event to the network or updating the measurement event.

In the present example, the duration of the time to trigger is controlled by the network. In the next example, the duration of the time to trigger is still controlled by the network.

Figure 8:
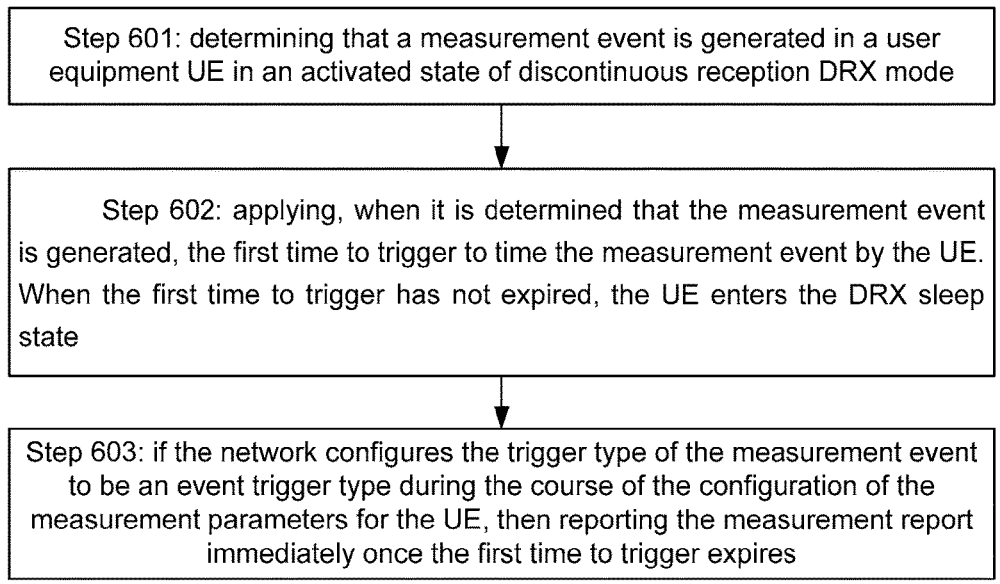
FIG. 8 is a flowchart of a further example of the method for reporting a measurement report of a measurement event of the present invention.
Figure 9:
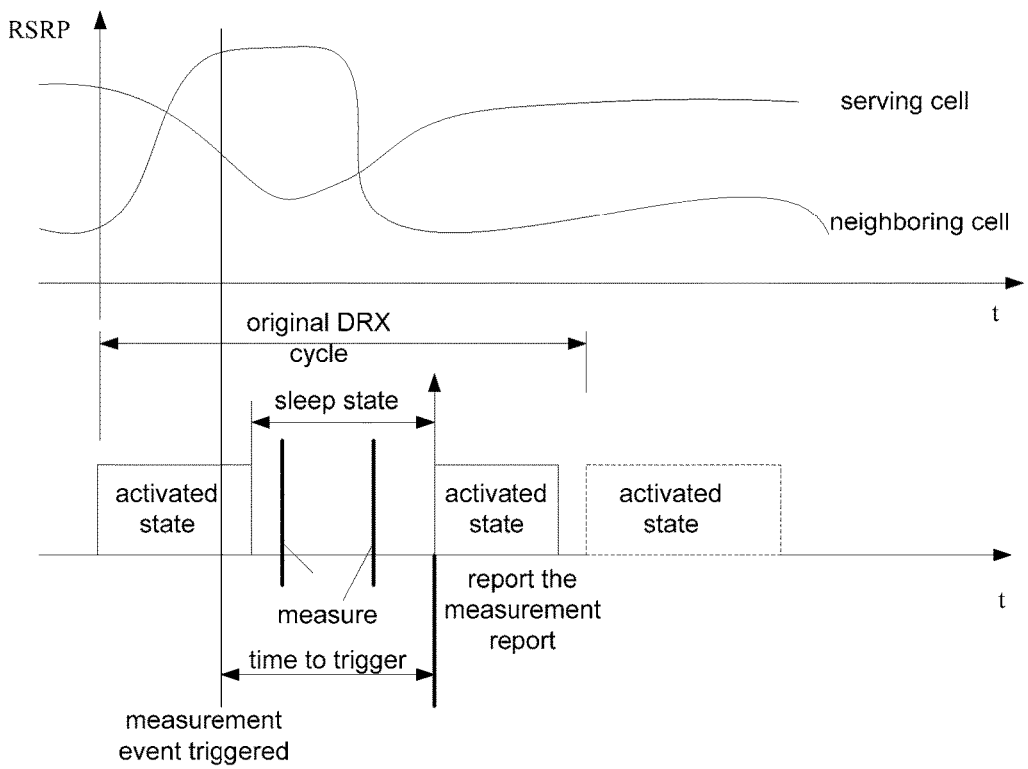
FIG. 9 is a schematic diagram shows the influence of the time to trigger on the reporting of the measurement report in the DRX mode in FIG. 6.

With reference to FIGS. 8 and 9, a further example of the method for reporting a measurement report of a measurement event of the invention includes:

Step 601: determining that a measurement event is generated in a user equipment UE in activated state of a discontinuous reception DRX mode.

The network configures the DRX mode for the UE according to factors such as a traffic feature of the UE, and configures measurement parameters for the UE; wherein the measurement parameters include a trigger type of measurement and the first time to trigger. The measurement event is generated by performing a measurement operation to the serving cell and at least one neighboring cell according to the measurement parameters configured by the network and reporting the measurement report; the measurement operation generates the measurement report when a certain condition is met.

If the trigger type of the measurement is periodic, the UE reports the measurement result according to the existing technology.

Step 602: the UE applying, when it is determined that there is the measurement event generated, the first time to trigger to time the measurement event. When the first time to trigger has not expired, the UE enters the DRX sleep state.

Step 603: if the network configures the trigger type of the measurement event to be an event trigger type during the course of the configuration of the measurement parameters for the UE, when the first time to trigger expires, the measurement report is reported immediately.

In the present example, the duration of the time to trigger is controlled by the network. In the next example, the duration of the time to trigger is still controlled by the network.

Figure 10:
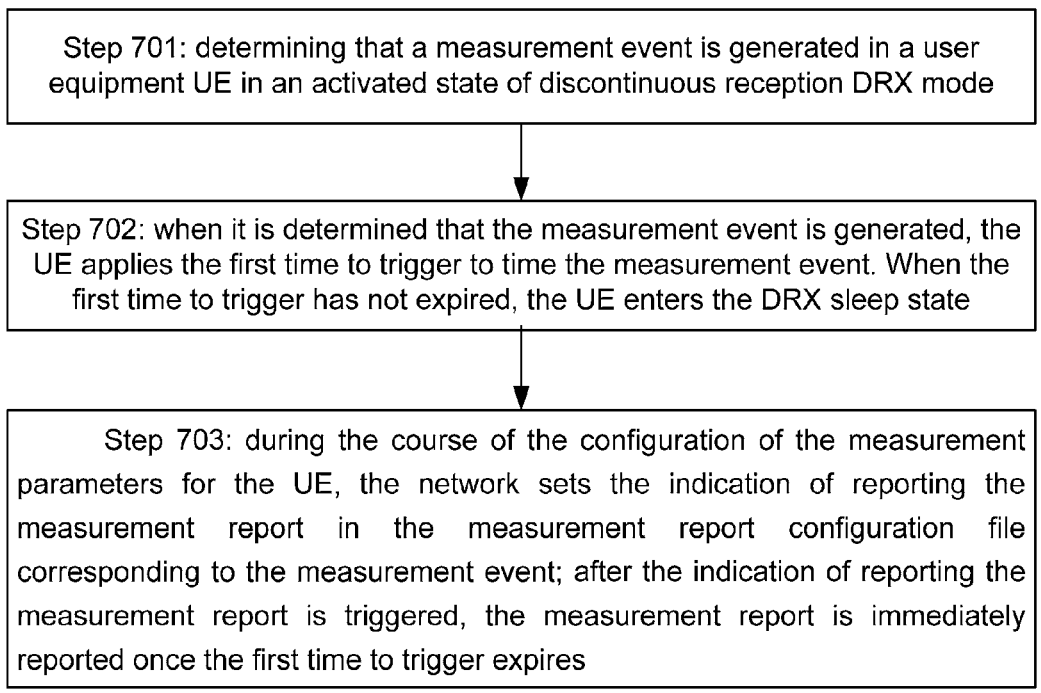
FIG. 10 is a flowchart of a further example of the method for reporting a measurement report of a measurement event of the present invention.

With reference to FIGS. 9 and 10, a further example of the method for reporting a measurement report of a measurement event of the invention includes:

Step 701: determining that there is a measurement event generated in a user equipment UE in activated state of a discontinuous reception DRX mode.

The network configures the DRX mode for the UE according to factors such as a traffic feature of the UE, and configures measurement parameters for the UE; wherein the measurement parameters include a trigger type of measurement, the first time to trigger and an indication of reporting the measurement report which is related with corresponding measurement event and set in a measurement report configuration file. The measurement event is generated by performing a measurement operation to the serving cell and at least one neighboring cell according to the measurement parameters configured by the network and reporting the measurement report; the measurement operation generates the measurement report when a certain condition is met.

If the trigger type of measurement is periodic, the UE reports the measurement result according to the existing technology.

Step 702: when it is determined that the measurement event is generated, the UE applies the first time to trigger to time the measurement event. When the first time to trigger has not expired, the UE enters the DRX sleep state.

Step 703: during the course of the configuring measurement parameters for the UE, the network sets an indication of reporting the measurement report in a measurement report configuration file corresponding to the measurement event;

after the indication of reporting the measurement report is triggered, once the first time to trigger expires, the measurement report will be reported immediately.

After the corresponding measurement event is generated, once the time specified by the first time to trigger arrives, and the indication of reporting the measurement report is triggered, the UE reports the measurement report immediately, regardless of the UE being in the DRX activated state or the sleep state. In this case, UE still performs the measurement operation in the DRX sleep state.

During the course of the configuring measurement parameters for the UE, the network sets the indication of reporting the measurement report in the measurement report configuration file corresponding to the measurement event, wherein, when the indication of reporting the measurement report is not triggered or the indication does not appear, the UE does not report the measurement result until re-entering the next activated state.

In another example, the step of making the UE, before the second time to trigger expires or at the expiring moment of the second time to trigger, to be in the next one or next several activated states of the DRX mode after the generation of the measurement event further may also be:

configuring at least two second times to trigger for the measurement event, the at least two times to trigger respectively corresponding to the neighboring cells with different sizes of coverage, so that the time from a time point at which the measurement event is generated to the time point at which the UE exits the DRX sleep state for the last time is less than or equal to the duration of the second time to trigger of the corresponding neighboring cell configured to the measurement event by the network, thereby making the UE, before the second time to trigger expires or at the expiring moment of the second time to trigger, to be in next one or next several activated states of the DRX mode after the generation of the measurement event.

Further, the example of the present invention can further provide other ideas. For example:

Step 1: configuring, by the network, measurement parameters for the UE, which include the trigger type and the time to trigger of measurement. The measurement parameters include the first time to trigger, the second time to trigger and the third time to trigger, . . . , pre-configured for the UE by the base station, these times to trigger respectively corresponding to different type of cells with different sizes of coverage.

Step 2: measuring, by the UE, the serving cell and at least one neighboring cell according to the measurement parameters configured by the network. The UE judges that one measurement event is generated according to the measurement result.

Step 3: the UE needs to deduce a level of the coverage area provided to the corresponding neighboring cell with the transmission power capacity contained in a system message broadcasted in the neighboring cell; or to deduce a level of the coverage area provided to the corresponding neighboring cell, according to information of different PCI (Physics Community ID) groups division corresponding to known cells with different levels of the coverage area as well as the PCI of the neighboring cell.

Step 4: applying, by the UE, corresponding TTT (time to trigger) according to the acknowledged level of the coverage area of the detected neighboring cell;

Step 5: reporting, when the duration specified by the effective time to trigger arrives and the condition of the measurement event is still satisfied, then the measurement report of the previous one activated state is reported.

Or,

Step 1: configuring, by the network, measurement parameters for the UE; including the trigger type and the time to trigger of measurement. The measurement parameters include the first time to trigger, and a first scaling factor coefficient, a second scaling factor coefficient, . . . , pre-configured to the UE by the base station, these scaling factor coefficients respectively corresponding to the cell types (optional) with different coverage areas;

Step 2: measuring, by the UE, the serving cell and at least one neighboring cell according to the measurement parameters configured by the network. The UE judges that one measurement event is generated according to the measurement result.

Step 3: the UE needs to deduce the level of the coverage area of the corresponding neighboring cell with the transmission power capacity contained in a system message broadcasted in the neighboring cell; or to deduce the level of the coverage area provided to the corresponding neighboring cell, according to information of different PCI (Physics Community ID) groups division corresponding to known cells with different levels of the coverage area as well as the PCI of the neighboring cell.

Step 4: the UE multiplying the corresponding scaling factor coefficient with the time to trigger so as to generate the effective time to trigger, according to the acknowledged level of the coverage area of the detected neighboring cell. The scaling factor coefficient can be configured by the base station during the measurement configuration, or can be a value saved by the UE itself.

Step 5: when the duration specified by the effective time to trigger arrives and the condition of the measurement event is still satisfied, the measurement report is then reported.

Figure 11:
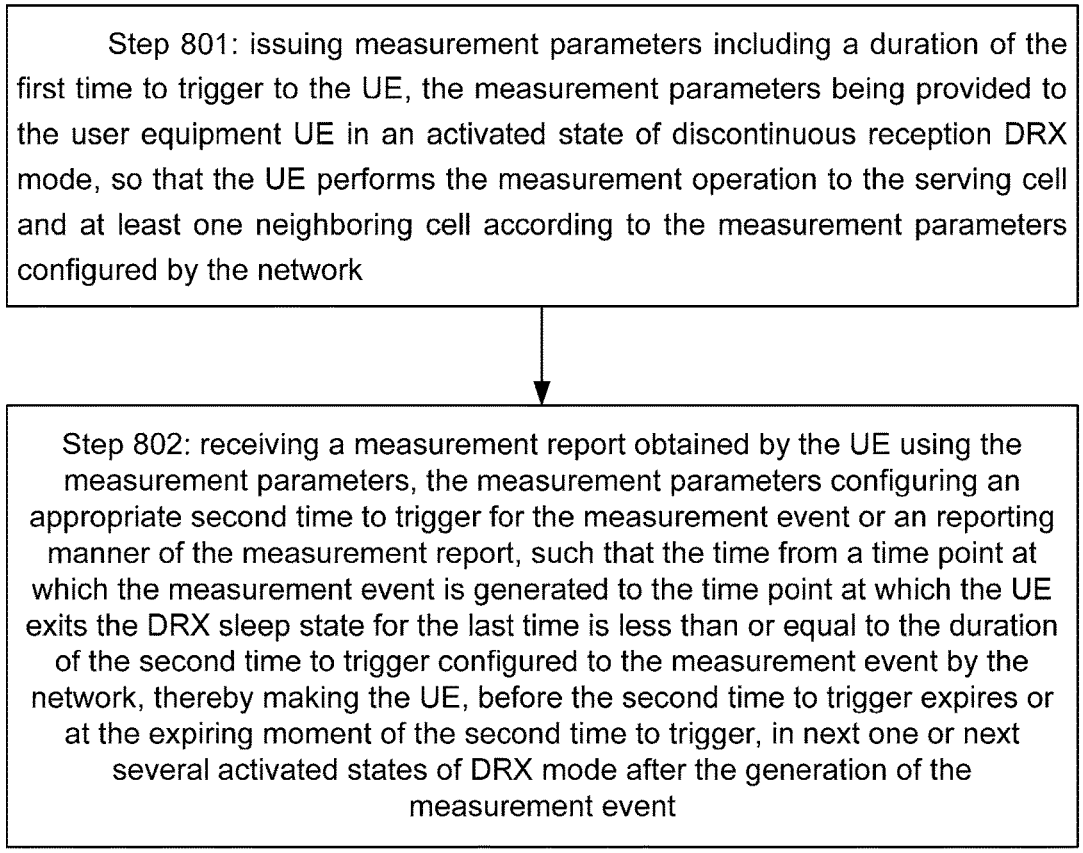
FIG. 11 is a flowchart of an example of the method for configuring a measurement parameter for UE of the present invention.

With reference to FIG. 11, the present invention further provides an example of the method for configuring measurement parameters for UE, the method including:

Step 801: issuing to the UE measurement parameters including a duration of the first time to trigger, the measurement parameters being provided to the user equipment UE in activated state of a discontinuous reception DRX mode, so that the UE performs the measurement operation to the serving cell and at least one neighboring cell according to the measurement parameters configured by the network.

In connection with the former description, there are at least the following ways of issuing the measurement parameters to the UE:

1) issuing the measurement parameters including the duration of the first time to trigger and the duration of the second time to trigger, the second time to trigger applied to the measurement event after the UE exits the DRX sleep state.

2) issuing to the UE the duration of at least two second times to trigger, the at least two second times to trigger respectively corresponding to the neighboring cells with different coverage areas, so that the time from a time point at which the measurement event is generated to the time point at which the UE exits the DRX sleep state for the last time is less than or equal to the duration of the second time to trigger corresponding to the neighboring cell configured to the measurement event by the network, thereby making the UE, before the second time to trigger expires or at the expiring moment of the second time to trigger, in the next one or next several activated states of the DRX mode after the generation of the measurement event.

Step 802: receiving a measurement report obtained by the UE using the measurement parameters, the measurement parameters configuring an appropriate second time to trigger for the measurement event or an reporting manner of the measurement report, such that the time from a time point at which the measurement event is generated to the time point at which the UE exits the DRX sleep state for the last time is less than or equal to the duration of the second time to trigger configured to the measurement event by the network, thereby making the UE, before the second time to trigger expires or at the expiring moment of the second time to trigger, be in the next one or next several activated states of the DRX mode after the generation of the measurement event.

In the present example, the process of controlling the UE is performed at the network side, so that to make the UE, before the time to trigger expires or at the expiring moment of the time to trigger, be is in the next one or next several activated states of the DRX mode after the generation of the measurement event.

Figure 12:
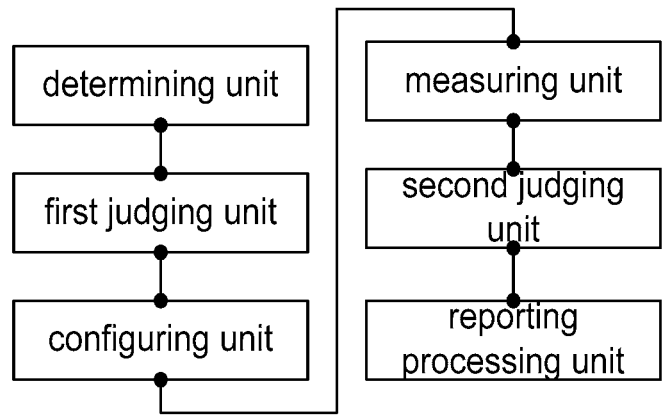
FIG. 12 is a functional block diagram of an example of the user equipment of the present invention.

With reference to FIG. 12, the present invention further provides an example of the user equipment, the user equipment including:

a determining unit, for determining that a measurement event is generated in a user equipment UE in activated state of a discontinuous reception DRX mode;

a first judging unit, for judging whether a first time to trigger corresponding to the measurement event is valid when the determining unit determines that a measurement event is generated;

a configuring unit for using, when it is judged by the first judging unit that the first time to trigger is valid, the first time to trigger to time the measurement event, and when it is judged by the first judging unit that the first time to trigger is invalid, using a second time to trigger to time the measurement event, such that the UE is in the next one or next several activated states of the DRX mode after the generation of the measurement event;

a measurement unit, for re-performing a measurement operation to a serving cell and at least one neighboring cell of the serving cell according to measurement parameters configured by a network, so as to obtain a measurement result, when the configuring unit uses the second time to trigger to time the measurement event;

a second judging unit for judging whether a previous one measurement event corresponding to the first time to trigger is still valid, according to the measurement result obtained by the measuring unit;

a reporting processing unit for reporting, when the second judging unit judges that the previous one measurement event is still valid, to the network the measurement report of the previous one measurement event; otherwise, not reporting the measurement report of the previous one measurement event to the network or updating the measurement event;

the measurement event being generated by performing a measurement operation to a serving cell and at least one neighboring cell of the serving cell according to the measurement parameters configured by the network and by reporting the measurement report, the measurement operation generating the measurement report when the conditions are met.

The configuring unit is specifically used to:

1) make the UE initiatively change the duration of the first time to trigger so as to obtain the second time to trigger, such that the time from a time point at which the measurement event is generated to the time point at which the UE exits the DRX sleep state for the last time is less than or equal to the duration of the second time to trigger configured to the measurement event by the network, thereby making the UE, before the second time to trigger expires or at the expiring moment of the second time to trigger, in an activated state of the DRX mode again; or 2) enable the second time to trigger configured by the network at a timing, when the first time to trigger configured by the network corresponding to the previous one measurement event expires and at the timing of the UE exiting the DRX sleep state, thereby making the UE, before the second time to trigger expires or at the expiring moment of the second time to trigger, in the next one or next several activated states of the DRX mode after the generation of the measurement event; or 3) when the first time to trigger expires, report the measurement report immediately according to the event trigger type configured by the network for the measurement event.

Wherein, the trigger type of the measurement event is configured as the event trigger type, and the indication of reporting the measurement report is set in the measurement report configuration files corresponding to the measurement event.

Or, 4) configure the duration of the at least two second times to trigger for the measurement event, the at least two times to trigger corresponding to the neighboring cells with different coverage areas, so that the time from a time point at which the measurement event is generated to the time point at which the UE exits the DRX sleep state for the last time is less than or equal to the duration of the second time to trigger of corresponding neighboring cell configured to the measurement event by the network, thereby making the UE, before the second time to trigger expires or at the expiring moment of the second time to trigger, in the next one or next several activated states of the DRX mode after the generation of the measurement event.

Figure 13:
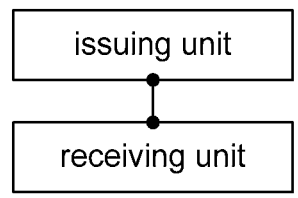
FIG. 13 is a functional block diagram of an example of the network equipment of the present invention.

With reference to FIG. 13, the present invention further provides an example of a network equipment, the network equipment including:

an issuing unit, for issuing measurement parameters to the UE, the measurement parameters being provided to the user equipment UE in activated state of a discontinuous reception DRX mode, so that the UE performs the measurement operation to the serving cell and at least one neighboring cell according to the measurement parameters configured by the network;

a receiving unit, for receiving a measurement report obtained by the UE with the measurement parameters, the measurement parameters configuring an appropriate time to trigger for the measurement event or a reporting manner of the measurement report, such that the time from a time point at which the measurement event is generated to the time point at which the UE exits the DRX sleep state for the last time is less than or equal to the duration of the time to trigger configured to the measurement event by the network, thereby making the UE, before the second time to trigger expires or at the expiring moment of the second time to trigger, in next one or next several activated states of DRX mode after the generation of the measurement event.

Wherein, the issuing unit is specifically used to:

1) issue the measurement parameters including the duration of the first time to trigger and the duration of the second time to trigger, the first time to trigger is applied to the corresponding previous one measurement event, the second time to trigger is applied to the measurement event after the UE exits the DRX sleep state, or 2) issue to the UE the measurement parameters for configuring the trigger type of the measurement event to be event trigger, so that the measurement report is immediately reported at the expiring moment of the time to trigger; or 3) issue the duration of the at least two times to trigger to the UE, the at least two times to trigger respectively corresponding to the neighboring cells with different coverage areas, so that the time from a time point at which the measurement event is generated to the time point at which the UE exits the DRX sleep state for the last time is less than or equal to the duration of the time to trigger corresponding to the neighboring cell configured to the measurement event by the network, thereby making the UE, before the time to trigger expires or at the expiring moment of the second time to trigger, in the next one or next several activated states of the DRX mode after the generation of the measurement event.

It can be understood that based on the spirit of the present invention, there may have more examples; each of the examples, each of the steps and units in the above can also be reasonably combined to obtain new examples; each of the units in the above can be arbitrarily merged, changed in sub-ordination relation, split and combined under the pre-condition of realizing the same purpose, and the example of the present invention is not limited.

Persons skilled in the art can further understand that all or part of the steps in the above method examples can be realized by programs to instruct the related hardware. The program can be stored in a computer-readable storage medium, and includes, when executed, the steps of any of the above method examples, for example, including the following steps of: determining that there is a measurement event generated in a user equipment UE in a discontinuous reception DRX mode activated state; judging whether a first time to trigger corresponding to the measurement event is valid when it is determined that there is a measurement event generated; using, when it is judged that the first time to trigger is valid, the first time to trigger to time the measurement event; using, when it is judged that the first time to trigger is invalid, a second time to trigger to time the measurement event, such that the UE is in the next one or next several activated states of the DRX mode after the generation of the measurement event; re-performing a measurement operation to a serving cell and at least one neighboring cell of the serving cell according to a measurement parameter configured by a network when the UE is in the next one or next several activated states of the DRX mode after the generation of the measurement event, so as to obtain the measurement result; judging whether a previous one measurement event is still valid according to the measurement result; reporting, when the previous one measurement event is still valid, to a network the measurement report corresponding to the previous one measurement event; otherwise, not reporting the measurement report of the previous one measurement event to the network or updating the measurement event. The storage medium can be: ROM/RAM, disk, solid state disk, memory card, USB flash disk or optical disk, etc.

The aforementioned description is just the embodiment of the present invention, instead of limiting the patent scope of the present invention. Any equivalent structure or equivalent flow transformation made by using the specification and drawings of the present invention is directly or indirectly applied in other related technical fields, and similarly fall within the patent protection scope of the present invention.

What is claimed is:

1. User equipment (UE) for reporting a measurement report of a measurement event, comprising:
    a memory storage comprising instructions; and
    a processor in communication with the memory, wherein the processor executes the instructions to:
    determine that a measurement event is generated in the UE in an activated state of discontinuous reception (DRX) mode;
    determine whether a first time to trigger corresponding to the measurement event is valid;
    use, when it is determined that the first time to trigger is valid, the first time to trigger to time the measurement event; when it is determined that the first time to trigger is invalid, using a second time to trigger to time the measurement event, such that the UE performs a measurement operation to a serving cell and at least one neighboring cell of the serving cell when being in a next one or next several activated states of the DRX mode after the generation of the measurement event, so as to obtain a measurement result;
    determine whether a previous one measurement event corresponding to the first time to trigger is still valid according to the measurement result; and
    when the previous one measurement event is still valid, reporting the measurement report corresponding to the previous one measurement event to a network; otherwise, not reporting the measurement report corresponding to the previous one measurement event to the network or updating the measurement event,
    wherein in determining whether the first time to trigger corresponding to the measurement event is valid, the processor is configured to:
    determine whether a time from a time point at which the measurement event is generated to a time point at which the UE enters a DRX sleep state is less than the duration of the first time to trigger configured to the measurement event by the network, and whether the time from a time point at which the measurement event is generated to the time point at which the UE exits the DRX sleep state for a last time is larger than the duration of the first time to trigger configured to the measurement event by the network;
    if the time from the time point at which the measurement event is generated to the time point at which the UE enters the DRX sleep state is less than the duration of the first time to trigger configured to the measurement event by the network, and the time from the time point at which the measurement event is generated to the time point at which the UE exits the DRX sleep state for the last time is larger than the duration of the first time to trigger configured to the measurement event by the network, the first time to trigger is determined to be invalid; if the time from a time point at which the measurement event is generated to the time point at which the UE enters the DRX sleep state is greater than or equal to the duration of the first time to trigger configured to the measurement event by the network, and the time from a time point at which the measurement event is generated to the time point at which the UE exits the DRX sleep state for the last time is less than or equal to the duration of the first time to trigger configured to the measurement event by the network, the first time to trigger is determined to be valid.

2. The UE according to claim 1, wherein in using the second time to trigger to time the measurement event, the processor is configured to:
    use an effective second time to trigger to time the measurement event, such that the UE, before the second time to trigger expires or at the expiring moment of the second time to trigger, enters the next one or next several activated states of the DRX mode after the generation of the measurement event.

3. The UE according to claim 2, before determining that the measurement event is generated in the UE in the activated state of DRX mode, the processor further executes the instructions to:
receive measurement parameters configured by a network, the measurement parameters comprising a duration of the first time to trigger; or
receive measurement parameters configured by the network, the measurement parameters comprising a duration of the first time to trigger, a duration of the second time to trigger and a starting timing of the second time to trigger.

4. The UE according to claim 3, wherein in using the effective second time to trigger the measurement event, the processor is configured to:
at a timing when the first time to trigger configured by the network corresponding to the previous one measurement event has expired and the UE exiting the DRX sleep state, start the second time to trigger configured by the network, thereby making the UE, before the second time to trigger expires or at the expiring moment of the second time to trigger, enter the next one or next several activated states of DRX mode after the generation of the measurement event.

5. The UE according to claim 1, wherein in the step of determining that the measurement event is generated in the UE in the activated state of the DRX mode,
the measurement event is generated by performing a measurement operation to a serving cell and at least one neighboring cell of the serving cell according to the measurement parameters configured by the network and reporting the measurement report.

6. User equipment (UE) for reporting a measurement report of a measurement event comprising:
a memory storage comprising instructions; and
a processor in communication with the memory, wherein the processor executes the instructions to:
determine that a measurement event is generated in the UE in an activated state of discontinuous reception (DRX) mode;
determine whether a first time to trigger corresponding to the measurement event is valid;
use, when it is determined that the first time to trigger is valid, the first time to trigger to time the measurement event when it is determined that the first time to trigger is invalid, using a second time to trigger to time the measurement event, such that the UE performs a measurement operation to a serving cell and at least one neighboring cell of the serving cell when being in a next one or next several activated states of the DRX mode after the generation of the measurement event, so as to obtain a measurement result;
determine whether a previous one measurement event corresponding to the first time to trigger is still valid according to the measurement result; and
when the previous one measurement event is still valid, reporting the measurement report corresponding to the previous one measurement event to a network; otherwise, not reporting the measurement report corresponding to the previous one measurement event to the network or updating the measurement event,
wherein in using the second time to trigger to time the measurement event, the processor is configured to:
use an effective second time to trigger to time the measurement event, such that the UE, before the second time to trigger expires or at the expiring moment of the second time to trigger, enters the next one or next several activated states of the DRX mode after the generation of the measurement event,
wherein before determining that the measurement event is generated in the UE in the activated state of DRX mode, the processor further executes the instructions to:
receive measurement parameters configured by a network, the measurement parameters comprising a duration of the first time to trigger; or
receive measurement parameters configured by the network, the measurement parameters comprising a duration of the first time to trigger, a duration of the second time to trigger and a starting timing of the second time to trigger; and
wherein in using the effective second time to trigger to time the measurement event, the processor is configured to:
make the UE change the duration of the first time to trigger so as to obtain the second time to trigger, such that a time duration from a time point at which the measurement event is generated to a time point at which the UE exits a DRX sleep state for a last time is less than or equal to the duration of the second time to trigger configured to the measurement event by the network, thereby making the UE, before the second time to trigger expires or at the expiring moment of the second time to trigger, enter the next one or next several activated states of the DRX mode after the generation of the measurement event.

7. A network equipment for configuring measurement parameters for a user equipment (UE) which generates a measurement event in an activated state of a discontinuous reception (DRX) mode, comprising:
a memory storage comprising instructions; and
a processor in communication with the memory, wherein the processor executes the instructions to:
issue the measurement parameters comprising a duration of a first time to trigger to the UE, such that the UE in the activated state of the DRX mode performs the measurement operation to the serving cell and at least one neighboring cell of the serving cell, according to the issued measurement parameters comprising the duration of the first time to trigger; and
receive a measurement report obtained by the UE with the measurement parameters, the measurement parameters configuring an appropriate duration of a second time to trigger for the measurement event or a reporting manner of the measurement report, such that a time from a time point at which the measurement event is generated to a time point at which the UE exits a DRX sleep state for a last time is less than or equal to a duration of the second time to trigger configured to the measurement event by the network, thereby making the UE, before the second time to trigger expires or at the expiring moment of the second time to trigger, enter a next one or next several activated states of the DRX mode after the generation of the measurement event.

8. The method according to claim 7, wherein in issuing the measurement parameters comprising the duration of the first time to trigger to the UE, the processor is configured to:
issue the measurement parameters comprising the duration of the second time to trigger, the second time to trigger applied to the measurement event after the UE exits the DRX sleep state.

9. The method according to claim 7, wherein in issuing the measurement parameters comprising the duration of the first time to trigger to the UE, the processor is configured to:

issue a duration of at least two second times to trigger to the UE, the at least two second times to trigger respectively corresponding to the neighboring cells with different coverage area, so that the time from a time point at which the measurement event is generated to the time point at which the UE exits the DRX sleep state for the last time is less than or equal to the duration of the second time to trigger, which corresponds to the neighboring cell configured to the measurement event by the network, thereby making the UE, before the second time to trigger expires or at the expiring moment of the second time to trigger, enter the next one or next several activated states of the DRX mode after the generation of the measurement event.

10. User equipment (UE) for reporting a measurement report of a measurement event, comprising:
a memory storage comprising instructions; and
a processor in communication with the memory, wherein the processor executes the instructions to:
determine that a measurement event is generated in the UE in an activated state of discontinuous reception (DRX) mode;
determine whether a first time to trigger corresponding to the measurement event is valid;
use, when it is determined that the first time to trigger is valid, the first time to trigger to time the measurement event; when it is determined that the first time to trigger is invalid, using a second time to trigger to time the measurement event, such that the UE performs a measurement operation to a serving cell and at least one neighboring cell of the serving cell when being in a next one or next several activated states of the DRX mode after the generation of the measurement event, so as to obtain a measurement result;
determine whether a previous one measurement event corresponding to the first time to trigger is still valid according to the measurement result; and
when the previous one measurement event is still valid, reporting the measurement report corresponding to the previous one measurement event to a network; otherwise, not reporting the measurement report corresponding to the previous one measurement event to the network or updating the measurement event,
wherein in using the second time to trigger to time the measurement event, the processor is configured to:
use an effective second time to trigger to time the measurement event, such that the UE, before the second time to trigger expires or at the expiring moment of the second time to trigger, enters the next one or next several activated states of the DRX mode after the generation of the measurement event,
wherein before determining that the measurement event is generated in the UE in the activated state of DRX mode, the processor further executes the instructions to:
receive measurement parameters configured by a network, the measurement parameters comprising a duration of the first time to trigger; or
receive measurement parameters configured by the network, the measurement parameters comprising a duration of the first time to trigger, a duration of the second time to trigger and a starting timing of the second time to trigger; and
wherein in using the effective second time to trigger the measurement event, the processor is configured to:
configure the duration of at least two second times to trigger for the measurement event, the at least two second times to trigger respectively corresponding to the neighboring cells with different coverage area, so that the time from a time point at which the measurement event is generated to the time point at which the UE exits the DRX sleep state for the last time is less than or equal to the duration of the second time to trigger corresponding to the neighboring cell configured to the measurement event by the network, thereby making the UE, before the second time to trigger expires or at the expiring moment of the second time to trigger, enter the next one or next several activated states of the DRX mode after the generation of the measurement event.

* * * * *